Patented Feb. 23, 1954

2,670,340

UNITED STATES PATENT OFFICE 2,670,340

ARALKYL PHENOLS AS ANTIOXIDANTS

Henry J. Kehe, Akron, Ohio, assignor to The B. F. Goodrich Company, New York, N. Y., a corporation of New York No Drawing. Application May 23, 1950, Serial No. 163,806

10 Claims. (Cl. 260—45.95)

This invention relates to the preservation and protection of organic materials subject to deterioration due to oxidation and other influences and more specifically pertains to the incorporation in rubber goods of certain aralkylated phenolic compounds, which have been found to function therein as extremely effective nonstaining flex-resisting anti-oxidants or age resistors.

It has already been proposed to employ certain phenolic compounds such as phenol, cresols, tertiary-butyl-phenols, rosolic acid, hydroxydiphenylether, naphthol, dinaphthol, indene phenols, etc., as antioxidants for organic materials which tend to decompose by absorption of oxygen from the atmosphere. One of the most active antioxidants of the phenolic type is the monobenzyl ether of hydroquinone known commercially as "AgeRite Alba." However, phenolic compounds are not as widely used as rubber antioxidants as are certain more efficient materials which are diaryl amines, and it has generally been thought that improved antioxidants must contain the diaryl amine structure.

I have now discovered that certain aralkylated phenols are highly effective antioxidants, being more efficient and economical than either the known phenolic antioxidants or the more widely used diaryl amine compounds. Accordingly, this invention comprises methods and compositions involving the use of such aralkyl phenols as antioxidants for the preservation of organic substances which tend to deteriorate in the presence of oxygen including such materials as fish oil, linseed oil, tung oil, carotene, lubricating oils, animal fats, soaps and, especially, rubbery unsaturated organic polymeric materials.

The term "rubbery unsaturated organic polymeric material" is employed to include all natural and synthetic unsaturated rubbery polymeric materials and especially those which may be considered to be polymers of conjugated dienes. Examples of such rubbery materials include the various natural crude rubbers (which are regarded as naturally-occurring isoprene polymers) and such synthetic rubber as polymers of conjugated dienes such as butadiene-1,3, isoprene, 2-methyl butadiene-1,3 and other butadiene-1,3 hydrocarbons, chloroprene, cyano butadiene-1,3 etc., as well as copolymers of these conjugated dienes with each other or with other unsaturated compounds copolymerizable therewith such as styrene, chlorostyrenes, isobutylene, acrylonitrile, methacrylonitrile, acrylic and methacrylic acids, alkyl acrylates and methacrylates, vinylidene chloride, vinyl pyridine, etc.

Specific members of the aralkylated phenol class of antioxidants or age resistors of this invention are, for example, 4-(1-phenylisopropyl) phenol, 2,4-di-(1-phenylisopropyl) phenol, 2,4,6-tri-(1-phenylisopropyl) phenol, 4-(1-phenyl-1-ethyl) phenol, 2,4-di-(1-phenyl-1-ethyl) phenol, 2,4,6-tri-(1-phenyl-1-ethyl) phenol, 4-(1-p-tolylisopropyl) phenol, 2,4-di-(1-p-tolylisopropyl) phenol, 2,4,6-tri(1-p-tolylisopropyl) phenol, 4-(1-p-tolyl-1-ethyl) phenol, 2,4-di-(1-p-tolyl-1-ethyl) phenol, 2,4,6-tri-(1-p-tolyl-1-ethyl) phenol, 2-(1-phenyl-1-ethyl) p-cresol, 2,6-di-(1-phenyl-1-ethyl) p-cresol, 2-(1-phenylisopropyl) p-cresol, 2,6-di-(1-phenylisopropyl) p-cresol, 5-methyl-2-(1-phenyl-1-ethyl) phenol, 5-methyl-2,4 (or 2,6) di-(1-phenyl-1-ethyl) phenol, 5-methyl-2-(1-phenylisopropyl) phenol, 5-methyl-2,4 (or 2,6) di-(1-phenylisopropyl) phenol, 3-methyl-2,4,6-tri-(1-phenyl-1-ethyl) phenol, 3-methyl-2,4,6-tri-(1-phenylisopropyl) phenol, 2-(1-phenylisopropyl) hydroquinone, 4-(1-phenylisopropyl) resorcinol, 4-(1-phenylisopropyl) catechol, 2-(1-phenyl-1-ethyl) hydroquione, 6-(1-phenylisopropyl) - 3 - hydroxy biphenyl, 5 - (1-phenylisopropyl) 2 - hydroxy biphenyl, 6 - (1-phenylisopropyl) - 2 - naphthol, di - (1 - phenylisopropyl)-2-naphthol, 1-(1-phenyl-1-ethyl)-2-naphthol, and di-(1-phenyl-1-ethyl)-2-naphthol.

All these compounds are aralkyl phenols containing from one to three aralkyl groups attached to the phenol nucleus and in which each aralkyl group consists of an aryl radical and an alkylidene radical of at least two carbon atoms, and has its connecting valence on the same carbon atom of the alkylidene radical to which the aryl group is attached. Any other aralkyl phenols of this nature are also contemplated by this invention.

Such aralkyl phenols can be prepared by well-known methods of organic synthesis. They can be prepared by condensing an aryl-substituted alkene hydrocarbon with a phenolic compound such as phenol, cresols, pyrocatechol, resorcinol, hydroquinone, pyrogallol, hydroxyhydroquinone, phloroglucinol, alpha-naphthol, beta-naphthol, etc., in the presence of a condensation catalyst such as AlCl₃, HCl, BF₃, concentrated sulfuric acid, and phosphoric acid. They can also be prepared quite advantageously by conducting the condensation in the presence of dilute sulfuric acid or a sulfonic acid catalyst as described in my copending application Ser. No. 163,808, filed May 23, 1950.

Aryl-substituted alkene hydrocarbons which can be condensed with phenols to produce the antioxidant compounds of this invention are those having the formula

where Ar is an aryl hydrocarbon group and the R groups are hydrogen or alkyl groups. As specific aralkylene compounds which are suitable reactants there may be mentioned styrene, alpha-methyl styrene, p-methyl-alpha-methyl styrene, beta-methyl styrene, 2-methallyl benzene, allyl benzene, isopropenyl naphthalene, allyl naphthalene, propenylbenzene, and the like.

The reactants can be condensed in various ratios of the aryl-substituted alkene hydrocarbon to the phenolic compound, the use of 1 to 3 moles of hydrocarbon to one mole of phenol being preferred. The resulting condensation products generally contain a mixture of mono-aralkylated phenols, di-aralkylated phenols and tri-alkylated phenols in proportions depending on the condensation ratio. In some instances, unreacted phenol and hydrocarbon as well as some polymerized hydrocarbon may also be present. To obtain the aralkyl phenolic compounds so prepared in sufficient purity for use as antioxidant, it is only necessary to remove the unreacted aralkylene hydrocarbon and the polymers (generally dimers) of the aralkylene hydrocarbon. Better protection of oxidizable materials can be achieved through the use of a condensation product which has also had the unreacted phenolic compound removed that is, by employing only a mixture of aralkylated phenols. Still better antioxidants are secured by removing the monoaralkylated phenol so as to secure, as the final product, a mixture containing only di- and tri-aralkylated phenols.

Aralkylated phenolic compounds which are preferred as antioxidants in this invention are the products resulting from the condensation of styrene or alpha-methyl styrene or similar homologues of styrene with monohydric phenols having the formula Ar—OH, where Ar is an aryl hydrocarbon group having 6 to 10 carbon atoms. Thus, the preferred compounds are those which have the general formula

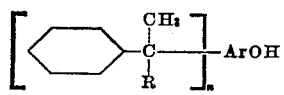

where

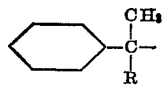

R being hydrogen or lower alkyl, is the aralkyl radical derived from styrene or its homologue; ArOH is the group derived from the monohydric phenolic compound and $n$ is an integer from 1 to 3. The especially preferred antioxidants are the di- and tri-aralkylated phenols of this structure ($n=2$ or 3), mixtures thereof, and mixtures of mono-, di- and triaralkylated phenols in which the di-aralkylated phenol is the most abundant and the mono-aralkylated phenol the least abundant ingredient.

In using the aralkylated phenolic compounds as antioxidants, they are incorporated, in any desired manner, with the oxidizable material to be protected. Only about 0.1 to 10% by weight of the antioxidant is generally sufficient to obtain adequate protection from oxidation. When used as non-staining, flex-resisting antioxidants for rubber goods, an amount from 0.5% to 5% by weight based on the rubbery material will generally give adequate protection.

The aralkylated phenolic compounds can be readily mixed with rubbery materials at the same time and in the same manner that vulcanizing or curing agents and other compounding ingredients are added. This is the preferred method of incorporating these antioxidants with natural crude rubber, and results in the antioxidant becoming uniformly dispersed throughout the rubber composition. However, in the case of the synthetic rubbery materials, such as the copolymers of butadiene with styrene or acrylonitrile prepared by polymerization in an aqueous medium, it is most convenient to add the aralkylated phenolic compound in an aqueous dispersion or emulsion to the latex as it comes from the polymerization equipment. Then, when the polymer is recovered from the latex by coagulation or precipitation, the antioxidant is already uniformly incorporated throughout the mass of the rubbery material. The synthetic rubbery material will thus be protected from the time it is made as well as after compounding and vulcanization.

The specific examples described hereinafter will illustrate the antioxidant or age-resisting properties of aralkylated phenols with respect to the protection of rubbery materials. The term "parts" as employed in the examples is used to indicate parts by weight.

The alkylated phenolic compounds were employed in the examples in three different compositions the recipes for which are given below:

COMPOSITION I
(Oil-resistant white stock)

| Ingredient | Parts |
|---|---|
| Copolymer of 67% butadiene-1,3 with 33% acrylonitrile [1] | 97 |
| Zinc oxide | 5 |
| Titanium dioxide | 70 |
| Stearic acid | 1.0 |
| Dibutyl phthalate | 15 |
| Bis-(2-benzothiazyl) disulfide | 1.5 |
| Sulfur | 1.5 |
| Antioxidant as indicated | 3.0 |

[1] 100 parts of copolymer containing 3% antioxidant added during manufacture.

COMPOSITION II
(Hepteen base white stock)

| Ingredient | Parts |
|---|---|
| Natural crude rubber | 100 |
| Zinc oxide | 85 |
| Titanium dioxide | 15 |
| Mixed paraffin vegetable wax [1] | 3 |
| Ultra marine blue | 0.2 |
| Stearic acid | 1.0 |
| Heptaldehyde-aniline reaction product [2] | 0.3 |
| Sulfur | 3.0 |
| Antioxidant as indicated | 2.0 |

[1] "Heliozone."
[2] "Hepteen base."

COMPOSITION III
(Tread stock)

| Ingredient | Parts |
|---|---|
| Natural crude rubber | 100 |
| Carbon black | 50 |
| Zinc oxide | 5.0 |
| Stearic acid | 3.0 |
| Bis(2-benzothiazyl)-disulfide | 1.0 |
| Sulfur | 3.0 |
| Antioxidant as indicated | 2.0 |

The vulcanizable rubbery compositions prepared according to the above three recipes were heated for various periods of time and at 300° F. or 280° F. as shown below. Test strips of each vulcanizate were subjected to stress-strain tests. Other test strips of each vulcanizate were subjected to accelerated aging in test tubes at an elevated temperature. This accelerated aging test is a modification of the Geer oven test and essentially consists of hanging test strips in large test tubes immersed in a heated oil bath and circulating fresh air in the test tube. This test is more fully described in the ASTM test D865–48T. Some of the aged test strips were subjected to stress-strain tests. Others of the aged test strips were subjected to flexing tests in the DeMattia Flexing Machine where the test strips were flexed and the number of flexures were automatically counted and recorded. The flex test was carried out until crack growth had reached a rating of 7, where a rating of 0 represents no cracking and a rating of 10 represents complete break or failure. The ratings were determined by a comparison of the crack growth with established standards for each rating. In the recitation of data appearing in each illustrative example the following abbreviations have the significance as indicated: T is ultimate tensile strength in pounds per square inch, E is percent elongation at break, M is the tensile strength at 300% elongation, F is the number of flex cycles for the rating indicated, and R is the flex crack growth rating.

EXAMPLE I

A disubstituted phenol, 5-methyl-2,4(or 2,6) di-(1-phenyl-1-ethyl) phenol, was employed as the antioxidant in Composition I. The resulting vulcanizable mixture was vulcanized at 300° F. 5-methyl-2,4(or 2,6) di-(1-phenyl-1-ethyl) phenol was also used as the antioxidant in Composition III and the resulting mixture was vulcanized at 280° F. The physical properties, before and after accelerated aging, the per cent retention or aging and the flex-resistance after aging of the various vulcanizates so obtained are tabulated below:

Table I

[Antioxidant: 5-methyl-di-2,4(or 2, 6)-(1-phenyl-1-ethyl) phenol]

BEFORE AGING

| Composition I | | | | Composition III | | | |
|---|---|---|---|---|---|---|---|
| Vulcanization Time (Minutes) | M | T | E | Vulcanization Time (Minutes) | M | T | E |
| 40 | 275 | 2,700 | 675 | 40 | 1,450 | 4,000 | 550 |
| 60 | 275 | 2,400 | 645 | 60 | 1,800 | 4,050 | 520 |
| 80 | 275 | 1,500 | 580 | 80 | 1,925 | 3,975 | 510 |

AFTER AGING

| 48 Hours at 250° F.: | | | | 48 Hours at 212° F.: | | | |
|---|---|---|---|---|---|---|---|
| 40 | 525 | 2,475 | 595 | 40 | 2,175 | 3,075 | 410 |
| 60 | 525 | 2,050 | 540 | 60 | 2,450 | 2,850 | 350 |
| 80 | 525 | 1,625 | 510 | 80 | 2,475 | 2,600 | 310 |

AVERAGE PERCENT RETENTION OF PHYSICAL PROPERTIES ON AGING

| T | E | T | E |
|---|---|---|---|
| 90 | 86 | 71 | 68 |

FLEX-TEST—AGED SAMPLES

| Vulcanization Time (Minutes) | F | R | Vulcanization Time (Minutes) | F | R |
|---|---|---|---|---|---|
| 40 | 112,500 | 3 | 40 | 140,000 | 7 |
| 60 | 65,000 | 3 | 60 | 86,600 | 7 |

The above data demonstrates that 5-methyl-2,4(or 2,6)-di-(1-phenyl-1-ethyl)-phenol is very efficient in protecting rubbery materials from deterioration by oxidation as evidenced by the high percentage of tensile strength and elongation retained after the accelerated aging. 5-methyl-2,4(or 2,6) - di - (1 - phenyl - 1 - ethyl) - phenol also imparts a long flex life to articles prepared from rubbery materials containing this compound as an antioxidant. Rubbery compositions similar to Compositions I and III except that they contain no antioxidant have very poor flex properties after accelerated aging. For example Composition III containing no antioxidant vulcanized for 60 minutes and aged as herein described has a flex rating of 3 at only 1750 flexures and a rating of 7 at only 3500 flexures.

EXAMPLE II

There was employed as an antioxidant in Compositions I and III, a mixture containing on a weight basis 15.4% 4-(1-phenyl-1-ethyl) phenol, 49% 2,4 - di - (1 - phenyl - 1 - ethyl) - phenol and 35.6% 2,4,6-tri-(1-phenyl-1-ethyl) phenol. This was the aralkylated phenol product resulting from the condensation of styrene with phenol in the mole ratio of 2 moles of styrene for each mole of phenol, after unreacted phenol and styrene and styrene dimer had been removed. Composition I was vulcanized at 300° F., and Composition III was vulcanized at 280° F. The data below shows the time of vulcanization. Stress-strain tests were run on test samples of each vulcanizate before and after accelerated aging. Also flex tests were made on aged test samples. The data from these tests are tabulated below:

Table II

[Antioxidant: Mixture of mono-, di- and tri-aralkylated phenols.]

BEFORE AGING

| Composition I | | | | Composition III | | | |
|---|---|---|---|---|---|---|---|
| Vulcanization Time (Minutes) | M | T | E | Vulcanization Time (Minutes) | M | T | E |
| 10 | 175 | 2,750 | 845 | 10 | 475 | 650 | 350 |
| 20 | 225 | 2,550 | 650 | 20 | 950 | 1,700 | 420 |
| 40 | 250 | 1,650 | 595 | 40 | 1,450 | 2,725 | 460 |
| 80 | 375 | 2,550 | 620 | 80 | 1,775 | 2,750 | 410 |
| 48 Hrs. @ 250° F.: | | | | 48 Hrs. @ 212° F.: | | | |
| 40 | 500 | 2,475 | 500 | 40 | 2,300 | 2,350 | 320 |
| 80 | 625 | 1,700 | 520 | 80 | | 1,950 | 260 |

FLEX TEST, COMPOSITION III
[After aging 48 hrs. @ 212° F.]

| Sample Vulcanized, 280° F. for Min. | Antioxidant Present | | No Antioxidant | |
|---|---|---|---|---|
| | R | F | R | F |
| 40 | 3 | 57,000 | 3 | 7,000 |
| 40 | 7 | 69,000 | 7 | 9,500 |
| 60 | 3 | 31,000 | 3 | 1,750 |
| 60 | 7 | 45,000 | 7 | 3,500 |

The above data clearly demonstrates that the mixture of the mono-, di-, and tri-aralkylated phenolic compounds protects rubbery materials from oxidation deterioration and imparts greatly increased flex life thereto.

EXAMPLE III

White vulcanizates were prepared according to the recipes for Compositions I and II hereinbefore set forth. The antioxidants employed were 5-methyl-2,4(or 2,6)-di-(1-phenyl-1-ethyl)-phenol and the mixture of mono-, di- and tri-(1-phenyl-1-ethyl) phenol described in Example II. Samples of the resulting four vulcanizates were tested for staining properties by placing them between both white lacquered and white enameled refrigerator panels for 96 hours at 80° C. None of the four vulcanizates caused staining of the white panels. Other samples of these four white rubbery vulcanizates were subjected to light discoloration tests and again no substantial discoloration was noted. However, such commercial non-coloring non-staining antioxidants as heptylated diphenyl amine and hydroquinone monobenzyl ether, when similarly employed, produce staining or discoloration.

The following tabulated examples will illustrate the effect on flex life and physical property retention of other members of the class of aralkylated phenolic compounds herein defined when used as antioxidants. These examples show data obtained with vulcanizates compounded in the Composition III recipe, vulcanized at 280° F. and aged 48 hrs. at 212° F.

*Table III.—Effect of aralkylated phenols on flex life and retention of physical properties after aging*

| Example No. | Compound Used as Antioxidant | Time Vulcanized, Min. | Flex Life | | Percent Tensile Strength Retained |
|---|---|---|---|---|---|
| | | | F where R=3 | F where R=7 | |
| 4 | None | 40 | 7,000 | 9,500 | 24 |
| | None | 60 | 1,750 | 3,500 | |
| 5 | 4-(1-phenyl-1-ethyl) phenol. | 40 | 60,000 | 87,500 | 66 |
| | | 60 | 60,000 | 75,500 | |
| 6 | 2,4-di-(1-phenyl-1-ethyl) phenol | 40 | 70,000 | 105,000 | 75 |
| | | 60 | 75,000 | 97,500 | |
| 7 | 2,4,6-tri-(1-phenyl-1-ethyl) phenol. | 40 | 65,000 | 105,000 | 72 |
| | | 60 | 67,500 | 95,000 | |
| 8 | 4-(1-phenylisopropyl) phenol. | 40 | 70,000 | 93,300 | 68 |
| | | 60 | 45,000 | 66,600 | |
| 9 | 2,4-di-(1-phenylisopropyl) phenol. | 40 | 67,000 | 91,600 | 55 |
| | | 60 | 40,000 | 51,000 | |
| 10 | 2,6-di-(1-phenyl-1-ethyl)-p-cresol. | 40 | 90,000 | 137,000 | 66 |
| | | 60 | 72,500 | 96,600 | |
| 11 | 5-methyl-2-(1-phenyl-1-ethyl) phenol. | 40 | 100,000 | 136,600 | 71 |
| | | 60 | 60,000 | 76,600 | |
| 12 | 2-(1-phenylisopropyl)-4-methyl-phenol. | 40 | 97,500 | 125,000 | 73 |
| | | 60 | 57,500 | 65,400 | |
| 13 | 2,4,-di-(1-phenylisopropyl)-5-methyl-phenol. | 40 | 65,000 | 100,000 | 59 |
| | | 60 | 40,000 | 46,000 | |

Examples 5 to 13 show that aralkylated phenolic compounds impart a long flex life to rubbery materials and preserve a high percentage of the physical properties while the rubbery material is aging.

In general the di,- and tri-aralkylated phenolic compounds have more effect on preserving the physical properties of vulcanized rubbery materials from oxidation than the mono-aralkylated phenolic compounds. Also the di- and tri-aralkylated phenolic compounds impart a greater flex life to vulcanized rubbery materials than do the mono-aralkylated phenolic compounds. The examples tabulated in Tables IV and V below illustrate this variance in degree of antioxidant properties between the mono-, di- and tri-aralkylated phenolic compounds.

Table IV.—*Comparison of antioxidant properties of mono-, di-, and tri-aralkylated phenolic compounds in white rubber compounds average per cent properties retained after aging*

| Example No. | Antioxidant Used, Chemical Name | Composition I,[1] Aged 48 hrs. at 250° F. | | Composition II,[2] Aged 24 hrs. at 212° F. |
|---|---|---|---|---|
| | | M | E | T |
| | | Percent | Percent | Percent |
| 14 | 4-(1-Phenyl-1-Ethyl) Phenol. | 230 | 75 | 54 |
| 15 | 2,4-Di-(1-Phenyl-1-Ethyl) Phenol. | 260 | 80 | 56 |
| 16 | 2,4,6-Tri-(1-Phenyl-1-Ethyl) Phenol. | 170 | 78 | 56 |

[1] Vulcanized at 300° F.
[2] Vulcanized at 280° F.

Table V.—*Comparison of antioxidant properties of mono-, di- and tri-aralkylated phenolic compounds in tread compounds—Composition III,[1] aged 48 hours at 212° F.*

| Example No. | Antioxidant Used | Average Percent T Retained | Vulc., Min. | Flex Life | | | |
|---|---|---|---|---|---|---|---|
| | | | | R | F | R | F |
| 17 | 4-(1-Phenyl-1-Ethyl) Phenol. | 66 | 40 | 3 | 60,000 | 7 | 87,500 |
| | | | 60 | 3 | 60,000 | 7 | 75,500 |
| 18 | 2,4-Di-(1-Phenyl-1-Ethyl) Phenol. | 75 | 40 | 3 | 70,000 | 7 | 105,000 |
| | | | 60 | 3 | 75,000 | 7 | 97,500 |
| 19 | 2,4,6-Tri-(1-Phenyl-1-Ethyl) Phenol. | 81 | 40 | 3 | 65,000 | 7 | 105,000 |
| | | | 60 | 3 | 67,500 | 7 | 95,000 |

[1] Vulcanized at 280° F.

The above data clearly show the superiority of the di- and tri-aralkylated phenolic compounds (Examples 18 and 19) over the mono-aralkylated phenol (Example 17) as antioxidants.

The following table illustrates the antioxidant effect of other aralkylated phenolic compounds. The data is for compositions aged 48 hours at 212° F.

All of the aralkylated phenolic compounds used in the above examples are superior as antioxidants to any of the phenolic compounds heretofore suggested for such use. This is especially true where it is desired to have a rubbery product that will maintain a high percentage of its physical properties throughout its useful life and still be a non-staining and substantially free from discoloration. Also the antioxidants of this new class impart a longer flex life to rubbery articles than do those of any other class of phenolic compounds. Aralkylated phenolic compounds are equivalent to most of the arylamine antioxidants employed in rubber compounding and possess the additional property of being non-staining and producing a rubber article substantially free from discoloration.

Having disclosed my invention by means of specific examples and specific chemical compounds, it is not my desire to limit myself solely thereto, for as hitherto stated, the precise proportions of materials employed may be varied and other members of the class of aralkylated phenols may be employed as desired, without departing from the spirit and scope of this invention as defined in the appended claims.

I claim:

1. A rubbery composition comprising a rubbery unsaturated organic polymeric material in which has been incorporated, as an antioxidant Table VI

| Example No. | Antioxidant Used | Percent Properties Retained | | | Vulc., Time | Flex Life | | |
|---|---|---|---|---|---|---|---|---|
| | | Composition I[1] | Composition III[2] | | | | | |
| | | M | E | T | | F where R=3 | F where R=7 | Stain[3] |
| 20 | 4-(1-p-Tolylisopropyl) Phenol. | 178 | 77 | 68 | 40 | 70,000 | 93,300 | None. |
| | | | | | 60 | 45,000 | 66,600 | |
| 21 | 2,4-Di-(1-p-Tolylisopropyl) Phenol. | 157 | 16 | 55 | 40 | 67,500 | 91,600 | None. |
| | | | | | 60 | 40,000 | 51,000 | |
| 22 | 3-Methyl-2,4,6-Tri-(1-Phenyl-1-Ethyl) Phenol. | 229 | 77 | 67 | 40 | 65,000 | 88,800 | Do. |
| | | | | | 60 | 46,350 | 51,900 | |
| 23 | 2,6-Di-(1-phenylisopropyl)-p-cresol. | 197 | 76 | 55 | 40 | 41,300 | 49,100 | Do. |
| 24 | Mixture of Mono- and Di- (1-phenylisopropyl)-p-cresol. | 191 | 77 | 56 | 40 | 75,000 | 97,500 | Do. |
| | | | | | 60 | 21,600 | 31,500 | |
| 25 | Mixture of Mono- and Di- (1-phenylisopropyl)-m-cresol. | 226 | 75 | 66 | 40 | 87,500 | 118,300 | Do. |
| | | | | | 60 | 55,000 | 63,300 | |
| 26 | 1-(1-phenylisopropyl)-2-Naphthol. | 237 | 77 | 48 | 40 | 66,300 | 79,600 | Do. |
| | | | | | 60 | 47,300 | 56,700 | |
| 27 | 1-(1-Phenyl-1-Ethyl)-2-Naphthol. | 282 | 75 | 47 | 40 | 63,800 | 74,000 | Do. |
| | | | | | 60 | 21,300 | 27,800 | |
| 28 | Di-(1-Phenyl-1-Ethyl)-2-Naphthol. | 264 | 76 | 41 | 40 | 46,000 | 54,000 | Do. |
| | | | | | 60 | 15,000 | 21,900 | |

[1] Vulcanized at 300° F.
[2] Vulcanized at 280° F.
[3] Test described in Example III.

therefor, from 0.1 to 10% by weight of a polyaralkylated monohydric phenol of the structure

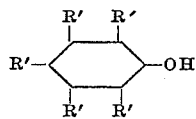

wherein from 2 to 3 of the R' groups represent aralkyl radicals of the structure

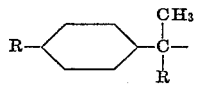

where R is selected from the class consisting of hydrogen and methyl, and the remaining R' groups are selected from the class consisting of hydrogen and methyl, no more than one R group being methyl.

2. A rubbery composition comprising a rubbery unsaturated organic conjugated diene polymeric material in which has been incorporated, as an antioxidant therefor, from 0.1 to 5% by weight of a polyaralkylated monohydric phenol of the structure

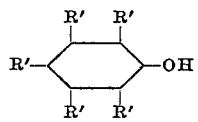

wherein from 2 to 3 of the R' groups represent aralkyl radicals of the structure

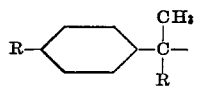

where R is selected from the class consisting of hydrogen and methyl, and the remaining R' groups are selected from the class consisting of hydrogen and methyl, no more than one R' group being methyl.

3. A rubbery composition comprising a rubbery unsaturated organic conjugated diene polymeric material in which has been incorporated, as an antioxidant therefor, from 0.1 to 5% by weight of a polyaralkylated monohydric phenol of the structure

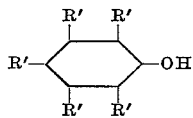

wherein from 2 to 3 of the R' groups represent 1-phenyl-1-ethyl radicals of the structure

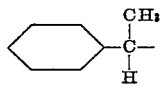

and the remaining R' groups are selected from the class consisting of hydrogen and methyl, no more than one R' group being methyl.

4. A rubbery composition as defined in claim 3 in which the polyaralkylated phenol is di-2,4-(1-phenyl-1-ethyl) phenol.

5. A rubbery composition as defined in claim 3 in which the polyaralkylated phenol is tri-2,4,6-(1-phenyl-1-ethyl) phenol.

6. A rubbery composition as defined in claim 3 in which the polyaralkylated phenol is a mixture of 2,4-di-(1-phenyl-1-ethyl) phenol with a lesser amount of 2,4,6-tri-(1-phenyl-1-ethyl phenol).

7. A rubbery composition as defined in claim 3 in which the polyaralkylated phenol is a di-(1-phenyl-1-ethyl) cresol.

8. A rubbery composition comprising a rubbery unsaturated organic conjugated diene polymeric material in which has been incorporated, as an anti-oxidant therefor, from 0.1 to 5% by weight of a polyaralkylated monohydric phenol of the structure

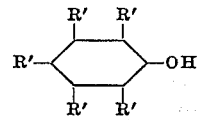

wherein from 2 to 3 of the R' groups represent 1-phenyl-isopropyl radicals of the structure

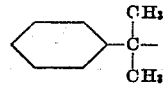

and the remaining R' groups are selected from the class consisting of hydrogen and methyl, no more than one R' group being methyl.

9. A rubbery composition as defined in claim 8 in which the polyaralkylated phenol is 2,4-di-(1-phenyl-isopropyl) phenol.

10. A rubbery composition as defined in claim 2 further characterized in that the composition is vulcanized.

HENRY J. KEHE.

References Cited in the file of this patent
UNITED STATES PATENTS

| Number | Name | Date |
|---|---|---|
| 1,989,788 | Calcott et al. | Feb. 5, 1935 |
| 2,225,920 | Martin | Dec. 24, 1940 |
| 2,495,145 | Smith et al. | Jan. 17, 1950 |
| 2,517,536 | Chenicek | Aug. 8, 1950 |
| 2,581,907 | Smith et al. | Jan. 8, 1952 |